2,829,976
Patented Apr. 8, 1958

2,829,976

PHOTOSENSITIVE DIAZO COMPOUND PLUS 3,3',5 TRI HYDROXY DIPHENYL AS A COUPLER

Martha Tomanek, Wiesbaden-Biebrich, Germany, assignor, by mesne assignments, to Keuffel & Esser Co., Hoboken, N. J., a corporation of New Jersey No Drawing. Application January 9, 1956
Serial No. 557,864

Claims priority, application Germany January 26, 1955

7 Claims. (Cl. 96—91)

The present invention relates to the field of diazotype photoprinting material. More particularly, it deals with light-sensitive diazotype material of the so-called two component type, the light sensitive layer containing a new azo component which was not used in the art of making white prints until now.

The diazotype process consists in the production of an azo dye image of the design to be reproduced. In the two component process, in addition to the diazo component, which is the light-sensitive component, there must be present an azo coupling component which couples during development with the diazo component not decomposed by light for the purpose of producing an azo dyestuff image. Aromatic hydroxy compounds with phenolic OH-groups are an important group of azo components. Both aromatic monohydroxy and polyhydroxy, e. g. dihydroxy compounds are very much in use in the diazotype process.

Now it has been found that 3,3',5-trihydroxy-diphenyl may be used with great advantage as a coupling component in the diazo printing technique for the formation of two-component layers, in combination with diazonium salts of p-phenylene diamines with a secondary or tertiary amino group.

Prints obtained by means of 3,3',5-trihydroxy-diphenyl show excellent contrasts and the images have very strong, deep brown color shades, when the salts or double salts of aromatic p-amino diazo compounds of the benzene series with a secondary or tertiary amino group are used as diazo components.

3,3',5-trihydroxy-diphenyl is very readily soluble in water, much more so that other aromatic hydroxy compounds, and on account of this property which is of great importance in practical respects, it is far superior to other aromatic hydroxy compounds. 3,3',5-trihydroxy-diphenyl has not been described before in the literature; it is obtained with high yield by transforming benzidine-3,3',5-trisulfonic acid first, by way of diazotization, into the corresponding tetrazo compound, from which tetrazo compound diphenyl-3,3',5-trisulfonic acid, in the form of the sodium salt, is obtained in known manner, and said sodium salt is then converted into 3,3',5-trihydroxy-diphenyl by melting with caustic potash.

The method of obtaining benzidine-3,3',5-trisulfonic acid and the complete method of obtaining 3,3',5-trihydroxy-benzidine therefrom follow:

One mol of benzidine (184 g.) or one mol of a benzidine salt, e. g. benzidine chlorohydrate or benzidine-sulfate, is introduced into 1000 g. of sulfuric acid monohydrate at a temperature of 40° C. The mixture is then heated up to 170° C. and 1000 g. of fuming sulfuric acid of a sufuric anhydride content of 20% are added. The reaction mixture is kept at this temperature for another two hours. When the reaction mass has cooled down it is poured onto 5 kg. of ice and 5 kg. of water, whereupon benzidine-tetra-sulfonic acid and benzidine-tri-sulfonic acid are dissolved, while benzidine-di-sulfonic acid precipitates. After filtering off the precipitate, the filtrate is mixed with 2 kg. of sodium chloride, whereupon benzidine-tetra-sulfonic acid and benzidine-tri-sulfonic acid precipitate. As the two acids differ in their solubility in water—benzidine-tetra sulfonic acid dissolving more easily in water than benzidine-tri-sulfonic acid—they can be easily separated.

The benzidine-tri-sulfonic acid obtained from 1 mol of benzidine according to the aforementioned method in the form of a damp acid paste is dissolved in 7 ltrs. of water. The temperature of the solution is reduced to 5° C., and the benzidine-tri-sulfonic acid is tetrazotized by means of a sodium nitrite solution, using about 270–280 cc. of a 40% sodium nitrite solution for the quantity in question. To the solution of the tetrazo compound thus formed there are added 1.5 ltrs. of 96% ethyl alcohol and some copper powder, and the mixture is heated over a water bath until a test with R-salt shows that no more tetrazo compound is present. After evaporating the alcohol, the acid solution is neutralized with a 25% caustic soda solution, purified by filtration, and then evaporated until a sample solidifies upon cooling. Thus the sodium salt of diphenyl-trisulfonic acid is precipitated which upon recrystallization from water forms colorless prisms. From this compound the diphenyl-trisulfonic acid trichloride (melting point 138–140° C.) and the diphenyl-tri-sulfanilide (melting point 158° C.) are obtained.

At a temperature of 260–270° C., the sodium salt of the dry diphenyl-trisulfonic acid is fused for 1 hour with 5 times its own quantity by weight of caustic potash. The molten mass is then poured into water and rendered Congo-acid by adding concentrated hydrochloric acid. Upon cooling the reaction mixture, 3,3',5-trihydroxy-diphenyl precipitates. Upon recrystallization from water it forms colorless prisms which melt at 178–179° C. By another method it may be salted out by adding sodium chloride to a dilute aqueous solution.

The following examples are inserted for the purpose of illustrating the present invention. Other diazonium salts of p-phenylene diamines with one secondary or tertiary amino group are just as suitable for coupling with 3,3',5-trihydroxy-diphenyl.

*Examples*

(1) A mixture consisting of:
0.7 g. of 3,3',5-trihydroxy diphenyl,
4.0 g. of citric acid,
3.0 g. of boric acid,
5.0 g. of thiourea,
2.0 g. of aluminum sulfate, and
4.0 g. of the trisodium salt of 1,3,6-naphthalene-trisulfonic acid is dissolved in 100 cc. of water while slightly heating. 2 g. of the zinc chloride double salt of the diazo compound of p-amino - N - diethyl-aniline are added to the solution, and one side of a base paper suitable for the preparation of diazo printing paper is then coated with this solution in a paper coating machine. The light sensitive paper, after drying, is exposed to light under a design such as a line drawing on transparent paper and then developed by subjecting it to the influence or action of gaseous ammonia, a strong brown positive image is obtained, which shows very good contrast.

(2) To a solution containing:
2.0 g. of the zinc chloride double salt of the diazo compound of 4-amino-1-N-ethyl-N-oxethyl-aniline,
3.0 g. of citric acid,
3.0 g. of boric acid,
4.0 g. of thiourea, and
3.5 g. of the trisodium salt of 1,3,6-naphthalene-trisulfonic acid in 75 cc. of water, there is added a solution of 0.7 g. of 3,3',5-trihydroxy-diphenyl in 25 cc. of hot water. A paper sheet is coated with this combined solution. The paper is then dried, exposed under a transparent pattern, and finally exposed to the action of gaseous ammonia. Prints with a strong brown color tone are obtained.

(3) 2 g. of the zinc chloride double salt of the diazo compound of 4-amino-1-N-di-n-propyl-aniline, together with the additional ingredients listed in Example 1, are dissolved in 100 cc. of water, and the solution is then mixed with 0.7 g. of 3,3',5 - trihydroxy - diphenyl. By coating a thin layer of this solution onto a suitable base paper, a diazo printing paper is prepared which is dried, exposed under an original, and finally developed by means of gaseous ammonia. The prints obtained show brown tints, which are distinctly deeper than those obtained with 3,3',5,5'-tetra-hydroxy-diphenyl or 2,2',4,4'-tetra-hydroxy-diphenyl.

(4) A diazo printing paper is prepared by coating onto a suitable paper support a solution containing:
2.0 g. of the zinc chloride double salt of the diazo compound of 1-ethyl-amino-2-methyl-4-amino-benzene,
3.5 g. of tartaric acid,
3.5 g. of thiourea,
3.0 g. of the trisodium salt of 1,3,6-naphthalene-trisulfonic acid, and
0.6 g. of 3,3',5-trihydroxy-diphenyl in 100 cc. of water. The prints obtained from such paper show the image of the original in deep brown shades.

(5) An aqueous solution containing:
2.0 g. of the zinc chloride double salt of the diazo compound of N-(4-amino-phenyl)-morpholine,
0.65 g. of 3,3',5-trihydroxy-diphenyl,
4.0 g. of citric acid,
3.0 g. of boric acid,
5.0 g. of thiourea,
2.0 g. of aluminum sulfate, and
6.0 g. of the sodium salt of 1,3,6-naphthalene-trisulfonic acid is made up with water to 100 cc. adding at the same time 4 cc. of isopropyl alcohol. The solution is then coated onto raw paper of the type customarily used in diazotype processes. After drying the light sensitized paper is exposed under a transparent original and an azo dye image is developed by means of gaseous ammonia. Thus a positive print is obtained with brown color shades, which are deeper than those of a print prepared with an analogously composed diazotype paper which in its light sensitive layer contains 3,3',5,5' - tetra - hydroxy-diphenyl, instead of the 3,3',5-trihydroxy-diphenyl used in the present example.

(6) A light sensitive paper is prepared by coating raw paper with a solution containing:

2.0 g. of the zinc chloride double salt of the diazo compound of N-(4-amino-phenyl)-thiomorpholine,
0.65 g. of 3,3',5-trihydroxy-diphenyl,
4.0 g. of citric acid,
3.0 g. of boric acid,
5.0 g. of thiourea,
2.0 g. of aluminum sulfate,
6.0 g. of the sodium salt of 1,3,6-naphthalene trisulfonic acid, and
6.0 cc. of isopropyl alcohol.

Prints produced by means of this paper show an image of the original in deep brown color shades.

Having thus described the invention, what is claimed is:
1. Photoprinting material comprising a light sensitive diazo derivative of a p-phenylene diamine of the following formula

$$H_2N\text{-phenylene-}X$$

wherein X is an amino group selected from the group consisting of secondary and tertiary amino groups and 3,3',5-trihydroxy-diphenyl as an azo dye coupling component carried on a base sheet material.

2. Photoprinting material comprising a light sensitive diazotized para-phenylene diamine without water solubilizing substituents having at least one hydrocarbon radical as a substituent in one of the amino groups and 3,3',5-trihydroxy-diphenyl as an azo dye coupling component carried on a base sheet material.

3. Photoprinting material comprising a light sensitive diazo compound of N,N-diethyl-para-phenylene diamine and 3,3',5-trihydroxy-diphenyl as an azo dye coupling component carried on a base sheet material.

4. Photoprinting material comprising a light sensitive diazo compound of N-ethyl-N-hydroxyethyl-para-phenylene diamine and 3,3',5-trihydroxy-diphenyl as an azo dye coupling component carried on a base sheet material.

5. Photoprinting material comprising a light sensitive diazo compound of N,N-di-(n)-propyl-para-phenylene diamine and 3,3',5-trihydroxy-diphenyl as an azo dye coupling component carried on a base sheet material.

6. Photoprinting material comprising a light sensitive diazo compound of 1-ethylamino - 2 - methyl-4-amino-benzene and 3,3',5-trihydroxy-diphenyl as an azo dye coupling component carried on a base sheet material.

7. Photoprinting material comprising a light sensitive diazo compound of N-(4-amino-phenyl)-morpholine and 3,3',5-trihydroxy-diphenyl as an azo dye coupling component carried on a base sheet material.

References Cited in the file of this patent
UNITED STATES PATENTS
2,694,010    Botkin et al. _____ Nov. 9, 1954